US012692403B2

(12) United States Patent (10) Patent No.: US 12,692,403 B2
Ishida et al. (45) Date of Patent: Jul. 28, 2026

(54) INK COMPOSITION FOR INK JET TEXTILE PRINTING AND METHOD OF INK JET TEXTILE PRINTING

(71) Applicant: SEIKO EPSON CORPORATION, Tokyo (JP)

(72) Inventors: Kohei Ishida, Matsumoto (JP); Yasuhiro Oki, Matsumoto (JP); Tomohiro Aruga, Matsumoto (JP); Natsumi Okada, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 127 days.

(21) Appl. No.: 18/407,585

(22) Filed: Jan. 9, 2024

(65) Prior Publication Data

US 2024/0228808 A1     Jul. 11, 2024

(30) Foreign Application Priority Data

Jan. 10, 2023     (JP) ................................. 2023-001525

(51) Int. Cl.
*C09D 11/328* (2014.01)
*C09D 11/36* (2014.01)
*C09D 11/38* (2014.01)

(52) U.S. Cl.
CPC ............ *C09D 11/328* (2013.01); *C09D 11/36* (2013.01); *C09D 11/38* (2013.01)

(58) Field of Classification Search
CPC ........ C09D 11/328; C09D 11/36; C09D 11/38
See application file for complete search history.

(56) References Cited

U.S. PATENT DOCUMENTS

| | | | |
|---|---|---|---|
| 6,727,296 B1 | 4/2004 | Pears et al. | |
| 9,102,158 B2 | 8/2015 | Aruga et al. | |
| 2006/0055750 A1 | 3/2006 | Taguchi et al. | |
| 2006/0055753 A1 | 3/2006 | Sekiguchi et al. | |
| 2008/0196178 A1 | 8/2008 | Diekmann et al. | |
| 2009/0035467 A1 | 2/2009 | Sekiguchi et al. | |
| 2011/0092624 A1 | 4/2011 | Sao et al. | |
| 2019/0100669 A1 * | 4/2019 | Murai ................. B41M 5/0023 |
| 2020/0122486 A1 | 4/2020 | Imamura et al. | |
| 2021/0301155 A1 | 9/2021 | Oki et al. | |

FOREIGN PATENT DOCUMENTS

| | | | |
|---|---|---|---|
| CN | 113462231 A | 10/2021 | |
| EP | 1243625 A1 * | 9/2002 | ............. C09D 11/38 |
| JP | 2002-348504 A | 12/2002 | |
| JP | 2003-503535 A | 1/2003 | |
| JP | 2019-085577 A | 6/2019 | |
| JP | 2020-002218 A | 1/2020 | |
| WO | 1998-014524 A1 | 4/1998 | |
| WO | 2000-078876 A1 | 12/2000 | |

* cited by examiner

*Primary Examiner* — Yaovi M Ameh
(74) *Attorney, Agent, or Firm* — Harness, Dickey & Pierce, P.L.C.

(57) ABSTRACT

An ink composition for ink jet textile printing according to the present disclosure contains a specific acidic dye being at least one selected from the group consisting of C.I. Acid Blue 112 and C.I. Acid Blue 140, a water-soluble organic solvent, and water. A glycol-based solvent and a cyclic amide-based solvent are contained as the water-soluble organic solvent. The cyclic amide-based solvent contains at least either ε-caprolactam or N-hydroxyethyl-2-pyrrolidone. The content of the glycol-based solvent is 10.0% by mass or more.

11 Claims, No Drawings

INK COMPOSITION FOR INK JET TEXTILE PRINTING AND METHOD OF INK JET TEXTILE PRINTING

The present application is based on, and claims priority from JP Application Serial Number 2023-001525, filed Jan. 10, 2023, the disclosure of which is hereby incorporated by reference herein in its entirety.

BACKGROUND

1. Technical Field

The present disclosure relates to an ink composition for ink jet textile printing and a method of ink jet textile printing.

2. Related Art

In recent years, ink jet printing has been expanding its use and used also in commercial printing, textile printing, and the like in addition to office and home printers.

Inks for ink jet are required to have excellent ejection reliability by an ink jet method in order to form desired patterns.

Ink compositions for ink jet textile printing, which are inks for ink jet to be applied to fabric, have also been used.

In particular, in ink compositions for ink jet textile printing, which are to be applied to fabric, by using an acidic dye having high hydrophobicity, a recorded product to be obtained can have good fastness, which is advantageous (for example, refer to JP-A-2002-348504).

In particular, C.I. Acid Blue 112 and C.I. Acid Blue 140 among various acidic dyes have the following features. That is, combining an ink composition containing a blue-based coloring material with ink compositions of other colors can expand a color reproduction area. By using C.I. Acid Blue 112 and C.I. Acid Blue 140 among various blue-based coloring materials, the color reproduction area can be made wider.

However, ink compositions for ink jet textile printing have had a problem in that when an acidic dye having high hydrophobicity, especially C.I. Acid Blue 112 or C.I. Acid Blue 140 is used, the storage stability of the ink compositions for ink jet textile printing reduces, nozzle clogging is likely to occur, and ejection reliability by the ink jet method is poor.

SUMMARY

The present disclosure has been made in order to solve the above problem and can be achieved as the following application examples.

An ink composition for ink jet textile printing according to an application example of the present disclosure contains a specific acidic dye being at least one selected from the group consisting of C.I. Acid Blue 112 and C.I. Acid Blue 140, a water-soluble organic solvent, and water. A glycol-based solvent and a cyclic amide-based solvent are contained as the water-soluble organic solvent. The cyclic amide-based solvent contains at least either ε-caprolactam or N-hydroxyethyl-2-pyrrolidone. The content of the glycol-based solvent is 10.0% by mass or more.

A method of ink jet textile printing according to an application example of the present disclosure has an ink adhesion step of causing the ink composition for ink jet textile printing according to the application example of the present disclosure to adhere to fabric by an ink jet method.

DESCRIPTION OF EMBODIMENTS

The following describes preferred embodiments according to the present disclosure in detail.

[1] Ink Composition for Ink Jet Textile Printing

The following first describes an ink composition for ink jet textile printing according to the present disclosure.

The ink composition for ink jet textile printing according to the present disclosure contains a specific acidic dye being at least one selected from the group consisting of C.I. Acid Blue 112 and C.I. Acid Blue 140, a water-soluble organic solvent, and water. A glycol-based solvent and a cyclic amide-based solvent are contained as the water-soluble organic solvent. The cyclic amide-based solvent contains at least either ε-caprolactam or N-hydroxyethyl-2-pyrrolidone. The content of the glycol-based solvent is 10.0% by mass or more.

By thus using C.I. Acid Blue 112 and C.I. Acid Blue 140, which are acidic dyes having high hydrophobicity, the fastness of a recorded product to be obtained can be made excellent. By using C.I. Acid Blue 112 and C.I. Acid Blue 140 among various acidic dyes, the following effects are produced. That is, by combining an ink composition containing a blue-based coloring material with ink compositions of other colors, a color reproduction area can be expanded, in which by using C.I. Acid Blue 112 and C.I. Acid Blue 140 among various blue-based coloring materials, the color reproduction area can be made wider.

By using the specific acidic dye and an organic solvent with a certain condition in combination, flocculation of the specific acidic dye in the ink composition for ink jet textile printing can be reduced, and the storage stability of the ink composition for ink jet textile printing can be made excellent. In addition, clogging in ink jet nozzles is less likely to occur, and even when the solid content of the ink composition for ink jet textile printing precipitates, the resolubility of the solid content can be made good. From the above, ejection reliability by an ink jet method can be made excellent. In particular, continuous ejection reliability by the ink jet method can be made excellent.

[1-1] Specific Acidic Dye

The ink composition for ink jet textile printing according to the present disclosure contains, as a coloring material, the specific acidic dye being at least one selected from the group consisting of C.I. Acid Blue 112 and C.I. Acid Blue 140.

By thus using the specific acidic dye, which is an acidic acid having high hydrophobicity, the fastness of the recorded product to be produced can be made good.

By containing at least one selected from the group consisting of C.I. Acid Blue 112 and C.I. Acid Blue 140 among various acidic dyes, the color reproduction area can be made wider.

The ink composition for ink jet textile printing according to the present disclosure is only required to contain, as the specific acidic dye, at least one selected from the group consisting of C.I. Acid Blue 112 and C.I. Acid Blue 140. The ink composition for ink jet textile printing according to the present disclosure may contain both C.I. Acid Blue 112 and C.I. Acid Blue 140.

With this, the color development of a recorded portion formed using the ink composition for ink jet textile printing can be further improved, and a color gamut can be expanded.

When the ink composition for ink jet textile printing according to the present disclosure contains both C.I. Acid Blue 112 and C.I. Acid Blue 140, $0.15 \leq XAB112/XAB140 \leq 1.80$ is preferred, $0.20 \leq XAB112/XAB140 \leq 1.00$ is more preferred, and $0.30 \leq XAB112/XAB140 \leq 0.60$ is even more preferred, wherein the content of C.I. Acid Blue 112 in the ink composition for ink jet textile printing according to the present disclosure and the content of C.I. Acid Blue 140 in the ink composition for ink jet textile printing are defined as XAB112 [% by mass] and XAB 140 [% by mass], respectively.

With this, the color reproduction area can be further expanded.

The content of the specific acidic dye in the ink composition for ink jet textile printing is preferably 12.0% by mass or less, more preferably 1.0% by mass or more and 9.0% by mass or less, and even more preferably 1.5% by mass or more and 7.0% by mass or less.

With this, sufficient color density is easily ensured in the recorded portion formed using the ink composition for ink jet textile printing, and the ejection reliability of the ink composition for ink jet textile printing by the ink jet method can be made quite excellent.

[1-2] Water

The ink composition for ink jet textile printing according to the present disclosure contains water.

Water is, for example, a component functioning as a solvent dissolving the coloring material or a dispersion medium dispersing the coloring material in the ink composition for ink jet textile printing.

By causing the ink composition for ink jet textile printing to contain water, a glycol-based solvent and a cyclic amide-based solvent, which will be described below in detail, can be contained uniformly in the ink composition for ink jet textile printing, and their functions can be effectively exhibited.

The content of water in the ink composition for ink jet textile printing is preferably 40.0% by mass or more and 80.0% by mass or less, more preferably 45.0% by mass or more and 75.0% by mass or less, and even more preferably 55.0% by mass or more and 65.0% by mass or less.

With this, the viscosity of the ink composition for ink jet textile printing can be adjusted to a suitable value more surely, and ejection reliability by the ink jet method can be further improved.

[1-3] Water-Soluble Organic Solvent

The ink composition for ink jet textile printing according to the present disclosure contains a water-soluble organic solvent satisfying a certain condition. More specifically, the glycol-based solvent and the cyclic amide-based solvent are contained as the water-soluble organic solvent. The cyclic amide-based solvent contains at least either ε-caprolactam or N-hydroxyethyl-2-pyrrolidone. The content of the glycol-based solvent in the ink composition for ink jet textile printing is 10.0% by mass or more.

By using the water-soluble organic solvent satisfying such a condition and the specific acidic dye described above in combination, flocculation of the specific acidic dye in the ink composition for ink jet textile printing can be reduced, and the storage stability of the ink composition for ink jet textile printing can be made excellent. In addition, clogging in ink jet nozzles is less likely to occur, and even when the solid content of the ink composition for ink jet textile printing precipitates, the resolubility of the solid content can be made good. From the above, ejection reliability by the ink jet method can be made excellent. In particular, continuous ejection reliability by the ink jet method can be made excellent.

[1-3-1] Glycol-Based Solvent

The glycol-based solvent as the water-soluble organic solvent contained in the ink composition for ink jet textile printing according to the present disclosure is a compound having a glycol structure (that is, a compound having a chemical structure having a structure in which hydrogen atoms bonded to two carbon atoms of an aliphatic hydrocarbon having two or more carbon atoms in the molecule are each replaced by a hydroxy group) or a compound with a structure in which a plurality of the above compounds are condensed (that is, a compound with a chemical structure having at least one ether oxygen atom in the molecule and having two hydroxy groups bonded to a hydrocarbon group or a compound having a glycol ether structure). The glycol-based solvent is contained in a state dissolved in water in the ink composition for ink jet textile printing.

Examples of the compound having a glycol structure include diethylene glycol, triethylene glycol, dipropylene glycol, tripropylene glycol, 1,2-butanediol, 1,2-pentanediol, 1,2-hexanediol, 1,2-heptanediol, 1,3-propanediol, 1,3-butanediol, 1,4-butanediol, 1,5-pentanediol, 1,6-hexanediol, 2-ethyl-2-methyl-1,3-propanediol, 2-methyl-1,3-propanediol, 2,2-dimethyl-1,3-propanediol, 3-methyl-1,3-propanediol, 3-methyl-1,5-pentanediol, and 2-methylpentane-2,4-diol. Examples of the compound having a glycol ether structure include triethylene glycol monobutyl ether, diethylene glycol monobutyl ether, dipropylene glycol monobutyl ether, and dipropylene glycol monopropyl ether.

Among these, the glycol-based solvent may be at least one selected from the group consisting of diethylene glycol, triethylene glycol, dipropylene glycol, tripropylene glycol, triethylene glycol monobutyl ether, diethylene glycol monobutyl ether, dipropylene glycol monobutyl ether, and dipropylene glycol monopropyl ether.

With this, the effects by the present disclosure described above are produced more markedly.

In particular, the glycol-based solvent may be triethylene glycol.

With this, for example, even when the ink composition for ink jet textile printing is stored for a long term or when it is stored under harsh conditions, the occurrence of foreign matter can be prevented more effectively, and the storage stability and the like of the ink composition for ink jet textile printing can be made quite excellent.

The ink composition for ink jet textile printing may contain, as the glycol-based solvent, the compound having a glycol structure and the compound having a glycol ether structure.

With this, trailing when the ink composition for ink jet textile printing is ejected by the ink jet method can be reduced more suitably.

When the ink composition for ink jet textile printing contains, as the glycol-based solvent, the compound having a glycol structure and the compound having a glycol ether structure, the following conditions may be satisfied. That is, the content of the compound having a glycol ether structure with respect to 100 parts by mass of the compound having a glycol structure is preferably 40 parts by mass or more and 250 parts by mass or less, more preferably 50 parts by mass or more and 200 parts by mass or less, and even more preferably 55 parts by mass or more and 180 parts by mass or less.

With this, the effect described above is produced more markedly.

The content of the glycol-based solvent in the ink composition for ink jet textile printing is only required to be 10.0% by mass or more and is preferably 10.0% by mass or more and 30.0% by mass or less, more preferably 10.0% by mass or more and 25.0% by mass or less, and even more preferably 10.0% by mass or more and 20.0% by mass or less.

With this, the solubility of the specific acidic dye is made better, and trailing when the ink composition for ink jet textile printing is ejected by the ink jet method can be reduced more suitably.

[1-3-2] Cyclic Amid-Based Solvent

The cyclic amide-based solvent as the water-soluble organic solvent contained in the ink composition for ink jet textile printing according to the present disclosure is a compound having a chemical structure of a cyclic amide in the molecule and is contained in a state dissolved in water in the ink composition for ink jet textile printing. Examples of the chemical structure of the cyclic amide include a lactam structure and a cyclic urea structure.

In particular, the ink composition for ink jet textile printing according to the present disclosure contains, as the cyclic amide-based solvent, at least either ε-caprolactam or N-hydroxyethyl-2-pyrrolidone.

The content of the cyclic amide-based solvent in the ink composition for ink jet textile printing is preferably 3.0% by mass or more, more preferably 3.5% by mass or more and 10.0% by mass or less, and even more preferably 5.0% by mass or more and 9.0% by mass or less.

With this, trailing when the ink composition for ink jet textile printing is ejected by the ink jet method can be reduced more suitably.

The ink composition for ink jet textile printing according to the present disclosure may further contain other cyclic amide-based solvents in addition to at least either ε-caprolactam or N-hydroxyethyl-2-pyrrolidone.

Examples of the other cyclic amide-based solvents include 2-pyrrolidone, N-methyl-2-pyrrolidone, 1,3-dimethyl-imidazolidinone, 2-piperidone (5-valerolactam), and N-cyclohexyl-2-pyrrolidone.

Note that the content of the other cyclic amide-based solvents in the entire cyclic amide-based solvent contained in the ink composition for ink jet textile printing is preferably 30% by mass or less and more preferably 25% by mass or less. The lower limit value of the content of the other cyclic amide-based solvents in the entire cyclic amide-based solvent contained in the ink composition for ink jet textile printing is 0% by mass.

The sum of the content of the glycol-based solvent and the content of the cyclic amide-based solvent in the ink composition for ink jet textile printing is preferably 15.0% by mass or more, more preferably 16.0% by mass or more and 40.0% by mass or less, and even more preferably 17.0% by mass or more and 34.0% by mass or less.

With this, the effects by the present disclosure described above can be produced more markedly.

$1.05 \leq XG/XL \leq 5.00$ is preferred, $1.10 \leq XG/XL \leq 4.00$ is more preferred, and $1.12 \leq XG/XL \leq 2.00$ is even more preferred, wherein the content of the glycol-based solvent and the content of the cyclic amide-based solvent in the ink composition for ink jet textile printing are defined as XG [% by mass] and XL [% by mass], respectively.

With this, the effects by the present disclosure described above are produced more markedly.

[1-3-3] Other Water-Soluble Organic Solvent Components

The ink composition for ink jet textile printing according to the present disclosure contains the glycol-based solvent and the cyclic amide-based solvent described above. In addition to this, the ink composition for ink jet textile printing according to the present disclosure may further contain other water-soluble organic solvents.

Examples of the other water-soluble organic solvents include glycerin.

When the ink composition for ink jet textile printing is one containing glycerin, the content of glycerin in the ink composition for ink jet textile printing is preferably 1.0% by mass or more and 25.0% by mass or less, more preferably 3.0% by mass or more and 20.0% by mass or less, and even more preferably 5.0% by mass or more and 15.0% by mass or less.

When the ink composition for ink jet textile printing is one containing the other water-soluble organic solvents other than glycerin, the content of the other water-soluble organic solvents other than glycerin in the ink composition for ink jet textile printing is preferably 10.0% by mass or less, more preferably 5.0% by mass or less, and even more preferably 2.0% by mass or less. The lower limit value of the content of the other water-soluble organic solvents other than glycerin in the ink composition for ink jet textile printing is 0% by mass.

[1-4] Other Coloring Materials

The ink composition for ink jet textile printing according to the present disclosure may further contain coloring materials other than the specific acidic dye in addition to the components described above.

With this, the color tone of the ink composition for ink jet textile printing and the recorded product to be produced using the ink composition for ink jet textile printing can be suitably adjusted.

In the following, the coloring materials other than the specific acidic dye are also referred to as "the other coloring materials."

Examples of the other coloring materials include acidic dyes other than the specific acidic dye, dyes other than acidic dyes, and pigments.

Examples of the acidic dyes other than the specific acidic dye include C.I. Acid Red 138, C.I. Acid Red 407, C.I. Acid Violet 48, C.I. Acid Violet 54, and C.I. Acid Violet 97. One or two or more in combination selected from these can be used. Among them, the acidic dyes other than the specific acidic dye are preferably one or more selected from the group consisting of C.I. Acid Violet 48 and C.I. Acid Violet 97 and more preferably C.I. Acid Violet 48.

With this, the color development of the recorded portion to be formed using the ink composition for ink jet textile printing can be further improved, and the color gamut can be further expanded. In addition, the fastness of the recorded portion to be produced can be made quite excellent.

When the ink composition for ink jet textile printing according to the present disclosure contains C.I. Acid Violet 48, the content of C.I. Acid Violet 48 in the ink composition for ink jet textile printing according to the present disclosure is preferably 0.4% by mass or more and 5.0% by mass or less, more preferably 0.6% by mass or more and 4.0% by mass or less, and even more preferably 0.8% by mass or more and 3.5% by mass or less, With this, the effects described above are produced more markedly.

When the ink composition for ink jet textile printing according to the present disclosure contains C.I. Acid Violet 48, $0.10 \leq XAV48/XIAD \leq 0.80$ is preferred, $0.15 \leq XAV48/XIAD \leq 0.75$ is more preferred, and $0.20 \leq XAV48/XIAD \leq 0.60$ is even more preferred, wherein the content of the specific acidic dye in the ink composition for ink jet textile printing according to the present disclosure and the content of C.I. Acid Violet 48 in the ink composition for ink jet textile printing are defined as XIAD [% by mass] and XAV48 [% by mass], respectively.

With this, the effects described above are produced more markedly.

When the ink composition for ink jet textile printing contains the other coloring materials, the content of the other coloring materials other than C.I. Acid Violet 48 in the ink composition for ink jet textile printing is preferably 3.5% by mass or less, more preferably 2.0% by mass or less, and even more preferably 1.0% by mass or less.

[1-5] Chelating Agent

The ink composition for ink jet textile printing according to the present disclosure may contain a chelating agent.

With this, the color reproduction area can be further extended.

Examples of the chelating agent include ethylenediamine tetraacetic acid, glutamic acid diacetic acid, dihydroxyethyl glycine, 3-hydroxy-2,2'-iminodisuccinic acid, aspartic acid diacetic acid, N-2-hydroxyethyl-iminodisuccinic acid, methylglycine diacetic acid, glutamine diacetic acid, and salts thereof. Among these, the chelating agent may be ethylenediamine tetraacetate.

With this, the effect described above is produced more markedly.

When the ink composition for ink jet textile printing according to the present disclosure contains the chelating agent, the content of the chelating agent in the ink composition for ink jet textile printing according to the present disclosure is preferably 0.01% by mass or more and more preferably 0.02% by mass or more and 1.0% by mass or less.

With this, the effect described above is produced more markedly.

[1-6] Surfactant

The ink composition for ink jet textile printing according to the present disclosure may contain a surfactant.

With this, the ejection reliability of the ink composition for ink jet textile printing by the ink jet method can be made quite excellent.

As the surfactant, for example, various surfactants such as anionic surfactants, cationic surfactants, and nonionic surfactants can be used.

Specific examples of the surfactant include Surfynol MD-20, Surfynol 82, Surfynol DF110D (2,5,8,11-tetramethyl-6-dodecyne-5,8-diol), the Olfine 104 series, the Olfine E series including Olfine E1010 (or higher), Olfine EXP4300 (a $C_{12}$-ethylene oxide adduct), Surfynol 61, Surfynol 465, Surfynol 1045, Surfynol 104PG50 (2,4,7,9-tetramethyl-5-decyne-4,7-diol), Surfynol 420 (product name, manufactured by Air Products Japan, Inc.), Olfine E1030W, and Silface SAG503A (manufactured by Nissin Chemical Co., Ltd.). One or two or more in combination selected from these can be used.

The content of the surfactant in the ink composition for ink jet textile printing is preferably 0.4% by mass or more, more preferably 0.45% by mass or more and 1.5% by mass or less, and even more preferably 0.5% by mass or more and 1.2% by mass or less.

With this, the ejection reliability of the ink composition for ink jet textile printing by the ink jet method can be made quite excellent. In addition, the color developability of the recorded portion to be formed using the ink composition for ink jet textile printing can be made quite excellent. Further, a problem of bleed-through can be prevented more effectively.

[1-7] Other Components

The ink composition for ink jet textile printing according to the present disclosure may contain components other the components described above. In the following, such components are also referred to as "the other components."

Examples of the other components include ureas such as urea, ethylene urea, tetramethyl urea, and thiourea; antiseptics; antimold agents; anticorrosives; flame retardants; various dispersants; antioxidants; UV absorbers; oxygen absorbers; dissolution aids; and penetrants.

Examples of the antiseptics and the antimold agents include sodium benzoate, sodium pentachlorophenol, sodium 2-pyridinethiol-1-oxide, sodium sorbate, sodium dehydroacetate, compounds having an isothiazoline ring structure in the molecule, such as 1,2-benzisothiazolin-3-one, and 4-chloro-3-methylphenol. Examples of the anticorrosives include benzotriazole.

The content of the other components is preferably 6.0% by mass or less, more preferably 5.0% by mass or less, and even more preferably 2.0% by mass or less.

The lower limit of the content of the other components is 0% by mass.

[1-8] Others

The surface tension of the ink composition for ink jet textile printing according to the present disclosure at 20° C., which is not particularly limited, is preferably 20 mN/m or more and 60 mN/m or less, more preferably 25 mN/m or more and 50 mN/m or less, and even more preferably 30 mN/m or more and 40 mN/m or less.

With this, clogging and the like in nozzles of ink jet heads becomes much less likely to occur, and the ejection reliability of the ink composition for ink jet textile printing further improves. In addition, even when nozzle clogging occurs, recoverability by capping nozzles can be made quite excellent.

As to the surface tension, a value measured by the Wilhelmy method or the ring method can be employed. For the measurement of the surface tension, a surface tension meter (for example, DY-300, DY-500, DY-700 or the like manufactured by Kyowa Interface Science Co., Ltd.) can be used.

The viscosity of the ink composition for ink jet textile printing according to the present disclosure at 20° C. is preferably 2 mPa-s or more and 10 mPa-s or less and more preferably 3 mPa-s or more and 8 mPa-s or less.

With this, the ejection reliability of the ink composition for ink jet textile printing by the ink jet method becomes quite excellent.

The viscosity can be determined by measurement with a vibration type viscometer, a rotary type viscometer, a capillary type viscometer, or a falling ball type viscometer. For example, as to the vibration type viscometer, the viscosity can be determined by measurement pursuant to JIS Z8809.

The ink composition for ink jet textile printing according to the present disclosure is only required to be used for ejection by the ink jet method. Examples of the ink jet method include on-demand systems such as the charge deflection system, the continuous system, the piezo system, and the bubble jet (registered trademark) system. In particular, the ink composition for ink jet textile printing according to the present disclosure may be one ejected from ink jet heads including piezo vibrators.

With this, degeneration of the coloring material and the like within ink jet heads is effectively prevented, and ejection reliability by the ink jet method can be made quite excellent.

[2] Ink Composition Set for Ink Jet Textile Printing

The following describes an ink composition set for ink jet textile printing according to the present disclosure.

The ink composition set for ink jet textile printing according to the present disclosure includes a plurality of ink compositions for ink jet textile printing. At least one ink composition for ink jet textile printing forming the ink composition set for ink jet textile printing is the ink composition for ink jet textile printing according to the present disclosure described above.

It is only required that at least one of the ink compositions for ink jet textile printing forming the ink composition set for ink jet textile printing according to the present disclosure be the ink composition for ink jet textile printing according to the present disclosure described above. The ink composition set for ink jet textile printing according to the present disclosure may include any ink composition for ink jet textile printing that is not the ink composition for ink jet textile printing according to the present disclosure described above.

The ink composition set for ink jet textile printing according to the present disclosure may include three ink compositions for ink jet textile printing corresponding to the three primary colors of color, that is, cyan, magenta, and yellow. The three primary colors of color may be further fractionalized by their color density. For example, in addition to cyan, magenta, and yellow, light cyan, light magenta, and light yellow may be included.

The ink composition set for ink jet textile printing according to the present disclosure may also include an achromatic ink, or more specifically, a black ink.

[3] Method of Ink Jet Textile Printing

The following describes a method of ink jet textile printing according to the present disclosure.

The method of ink jet textile printing according to the present disclosure has an ink adhesion step of causing the ink composition for ink jet textile printing according to the present disclosure described above to adhere to fabric by the ink jet method.

With this, ejection by the ink jet method can be stably performed while preventing nozzle clogging, and recorded products having excellent fastness and reliability can be stably produced.

[3-1] Ink Adhesion Step

In the ink adhesion step, the ink composition for ink jet textile printing according to the present disclosure described above is ejected by the ink jet method to cause it to adhere to fabric as a recording medium. With this, a desired image is formed. For the image formation, a plurality of ink compositions for ink jet textile printing may be used.

The ink jet method for ejecting the ink composition for ink jet textile printing may be any system. Examples of the system include on-demand systems such as the charge deflection system, the continuous system, the piezo system, and the bubble jet (registered trademark) system.

[3-2] Dyeing Processing Step

The present embodiment further includes, after the ink adhesion step, a dyeing processing step of fixing the coloring material adhering to the fabric.

With this, the fastness and reliability of the recorded product to be produced can be made particularly excellent.

The dyeing processing step is usually performed under a high-temperature humidifying condition.

The processing temperature in the dyeing processing step, which is not particularly limited, is preferably 90° C. or higher and 150° C. or lower, more preferably 95° C. or higher and 130° C. or lower, and even more preferably 98° C. or higher and 120° C. or lower.

With this, the coloring material can be fixed more efficiently while effectively preventing undesired degeneration, deterioration, and the like of the fabric as a recording medium, the components of the ink composition for ink jet textile printing, and the like.

The processing time in the dyeing processing step, which is not particularly limited, is preferably 1 minute or more and 120 minutes or less, more preferably 2 minutes or more and 90 minutes or less, and even more preferably 3 minutes or more and 60 minutes or less.

With this, the productivity of the recorded product can be made quite excellent while making the dyeing properties of the coloring material to the fabric as a recording medium quite excellent.

For the high-temperature humidifying processing in the dyeing processing step, various steamers, such as Steamer Type DHe manufactured by Mathis AG, can be used.

The method of ink jet textile printing according to the present disclosure may include steps other than the ink adhesion step and the dyeing processing step as needed.

For example, prior to the ink adhesion step, a pretreatment step of performing pretreatment on the fabric as a recoding medium may be included.

For the pretreatment, for example, known pretreatment agents can be used. The pretreatment agents generally contain a glue agent, a pH adjusting agent, and a hydrotropic agent.

As the glue agent, for example, natural gums, starches, seaweeds, plant skins, cellulose derivatives, processed starches, processed natural gums, sodium alginate, algin derivatives, synthetic glues, emulsions, and the like can be suitably used.

Examples of the natural gums include guar and locust bean. Examples of the seaweeds include gloiopeltis. Examples of the plant skins include pectic acid. Examples of the cellulose derivatives include methyl cellulose, ethyl cellulose, hydroxyethyl cellulose, and carboxymethyl cellulose. Examples of the processed starches include roasted starch, alpha starch, carboxymethyl starch, carboxyethyl starch, and hydroxyethyl starch. Examples of the processed natural gums include Shiraz gum-based processed natural gums and locust bean gum-based processed natural gums. Examples of the synthetic glues include polyvinyl alcohol and polyacrylates.

As the pH adjusting agent, for example, acid ammonium salts such as ammonium sulfate and ammonium tartrate can be suitably used.

As the hydrotropic agent, for example, various ureas such as urea and alkyl ureas such as dimethyl urea, thiourea, monomethyl thiourea, and dimethyl thiourea can be used.

The pretreatment agents may further contain, for example, silica.

For example, after the dyeing processing step, a washing step of performing washing processing on the dye-fixed fabric may be included as needed.

The washing step can be performed by, for example, washing the dye-fixed fabric by rubbing it with tap water and then immersing the fabric in a washing liquid in which a nonionic soaping agent is added to hot water at 40° C. or higher and 70° C. or lower with stirring as appropriate. The immersion time in the washing liquid can be, for example, 5 minutes or more and 60 minutes or less. Subsequently, the washing liquid can be removed by washing the fabric by rubbing it with hands while pouring tap water into the washing liquid.

[3-3] Fabric

The following describes fabric as a recording medium to which the ink composition for ink jet textile printing is applied.

As the fabric, various woven fabrics with plain weave, twill weave, satin weave, derivative plain weave, derivative twill weave, derivative satin weave, special weave, figured weave, half double weave, double texture, multiple texture, warp pile weave, weft pile weave, and leno weave, and the like can be used.

The thickness of fibers forming the fabric can be, for example, 10 d or more and 100 d or less.

Examples of the fibers forming the fabric include synthetic fibers such as polyester fibers, nylon fibers, triacetate fibers, diacetate fibers, polyamide fibers, and cellulose fibers; regenerated fibers such as rayon; and natural fibers such as cotton, silk, and wool. Blended fabrics of these may also be used.

[4] Recorded Product

The recorded product according to the present disclosure has a colored portion by the ink composition for ink jet textile printing according to the present disclosure applied to the fabric by the ink jet method. The recorded product can be produced using the method of ink jet textile printing described above.

With this, the occurrence of faults caused by faulty ejection and the like by the ink jet method can be effectively prevented, and the recorded product having excellent fastness and reliability can be provided.

Preferred embodiments according to the present disclosure have been described, but the present disclosure is not limited to these.

EXAMPLES

The following describes specific examples according to the present disclosure.

[5] Preparation of Ink Composition for Ink Jet Textile Printing

Example 1

The components listed in Table 1 were put into a certain container with a certain ratio, and the mixture was mixed together and stirred with a stirrer for 1 hour. Subsequently, the mixture was filtered with a membrane filter with a pore size of 1 μm (manufactured by Merck Millipore, Ominipore membrane filter: JAWP) to obtain an ink composition for ink jet textile printing with the composition listed in Table 1.

Examples 2 to 35

Ink compositions for ink jet textile printing were prepared in the same manner as in Example 1 except that the types of the components for use in the preparation of the ink composition for ink jet textile printing and the blending ratio of each component were changed to be compositions listed in Table 1 to Table 5.

Comparative Examples 1 to 6

Ink compositions for ink jet textile printing were prepared in the same manner as in Example 1 except that the types of the components for use in the preparation of the ink composition for ink jet textile printing and the blending ratio of each component were changed to be compositions listed in Table 6.

[6] Evaluation

The following evaluations were performed for the ink compositions for ink jet textile printing of the respective examples and the respective comparative examples.

[6-1] Continuous Ejection Reliability

The ink compositions for ink jet textile printing of the respective examples and the respective comparative examples were each charged into an ink jet textile printer "Monna Lisa Evo Tre 32-180" (manufactured by Seiko Epson Corporation). A roll of 100% silk fabric (twill, 50 to 60 g/m², width: 140 centimeters) subjected to pretreatment was set, and continuous printing was performed in "600×600 D.P.I., 2 Pass" mode.

The pretreatment on the silk fabric was performed by applying a pretreatment liquid produced by mixing together 1% by mass of sodium alginate, 1% by mass of guar gum, 4% by mass of ammonium sulfate, 10% by mass of urea, and 84% by mass of water to the fabric, wringing it out with a mangle with a pickup rate of 20%, and drying it.

Nozzle checking was performed for each feed amount of 100 meters of the silk fabric. It was checked whether normal printing was performed without missing, bending, or the like, and an evaluation was performed in accordance with the following criteria.

A: The feed amount of the silk fabric with normal printing is 1,000 meters or more.

B: The feed amount of the silk fabric with normal printing is 500 meters or more and less than 1,000 meters.

C: The feed amount of the silk fabric with normal printing is 200 meters or more and less than 500 meters.

D: The feed amount of the silk fabric with normal printing is less than 200 meters.

[6-2] Ejection Recoverability

The ink compositions for ink jet textile printing of the respective examples and the respective comparative examples were each charged into a Cyan row of an ink jet printer "EW-M770T" (manufactured by Seiko Epson Corporation).

Next, a cleaning operation was performed. In the middle of the operation, or more specifically, when an ink jet head had left a Cap portion and moved to a printing portion, a power supply cable was disconnected to forcefully stop the ink jet head.

After leaving this state in an environment of 20° C./25% RH for 2 weeks, the power supply cable was again coupled to turn on the power. Subsequently, the number of times of cleaning required until normal ejection was achieved was counted, and an evaluation was performed in accordance with the following criteria.

A: Recovery was achieved by four-time or less cleaning.
B: Recovery was achieved by five-time or more and seven-time or less cleaning.
C: Recovery was achieved by eight-time or more and ten-time or less cleaning.
D: Recovery was not achieved even by ten-time cleaning.

[6-3] Storage Stability

The ink compositions for ink jet textile printing of the respective examples and the respective comparative examples were each charged into a certain ink housing container and left in an environment of 60° C. for 5 days.

Subsequently, in the same manner as in [6-2] above, the ink housing container was mounted on the ink jet printer. The ink composition for ink jet textile printing was ejected, and further an evaluation was performed in accordance with the same criteria.

[6-4] Color Development

First, fabric made of nylon (nylon 6 taffeta manufactured by Shikisensha Co., Ltd.) was prepared.

The following pretreatment liquid was applied to the fabric, which was wrung out with a mangle with a pickup rate of 20% and was dried to obtain fabric for recorded product production.

Sodium alginate: 1.0% by mass
Guar gum: 1.0% by mass
Ammonium sulfate 4.0% by mass
Urea: 10.0% by mass
Water: 84.0% by mass An ink cartridge into which the ink compositions for ink jet textile printing of the respective examples and the respective comparative examples were each charged was mounted on an ink jet textile printer "Monna Lisa Evo Tre 16" manufactured by Seiko Epson Corporation. Solid printing was performed uniformly on the fabric for recorded product production so as to give an application amount per unit area of 1.2 mg/cm$^2$ in "900×600 D.P.I., 2 Pass" printing mode.

After printing, steaming processing of 100° C.×30 minutes was performed using a steamer (manufactured by Mathis AG, Steamer Type DHe). Subsequently, the fabric was washed with water to remove unfixed dye.

Further, the fabric was washed using hot water at 55° C. containing 0.2% by mass of Laccol STA (a washing aid manufactured by Meisei Chemical Works, Ltd.) for 10 minutes and was dried to obtain textile printed fabric as a recorded product.

For the solid image formed on each textile printed fabric obtained as above, OD-Cyan was measured using a spectral densitometer (manufactured by X-Rite, Incorporated, "X-Rite 938"). Cyan image density was determined in accordance with the following criteria.

A: The image density is 1.5 or more.
B: The image density is 1.2 or more and less than 1.5.
C: The image density is 0.7 or more and less than 1.2.
D: The image density is less than 0.7.

[6-5] Fastness

First, two kinds of pieces of fabric, that is, <1> fabric made of silk (silk habutae 14 monme manufactured by Shikisensha Co., Ltd.) and (2) fabric made of nylon (nylon 6 taffeta manufactured by Shikisensha Co., Ltd.) were prepared.

The following pretreatment liquid was applied to these pieces of fabric, which were wrung out with a mangle with a pickup rate of 20% and were dried to obtain pieces of fabric for recorded product production.

Sodium alginate: 1.0% by mass
Guar gum: 1.0% by mass
Ammonium sulfate 4.0% by mass
Urea: 10.0% by mass
Water: 84.0% by mass An ink cartridge into which the ink compositions for ink jet textile printing of the respective examples and the respective comparative examples were each charged was mounted on an ink jet textile printer "Monna Lisa Evo Tre 16" manufactured by Seiko Epson Corporation. Solid printing was performed uniformly on the pieces of fabric for recorded product production so as to give an application amount per unit area of 1.2 mg/cm$^2$ in "900×600 D.P.I., 2 Pass" printing mode.

After printing, steaming processing of 100° C.×30 minutes was performed using a steamer (manufactured by Mathis AG, Steamer Type DHe). Subsequently, the pieces of fabric were washed with water to remove unfixed dye.

Further, the pieces of fabric were washed using hot water at 55° C. containing 0.2% by mass of Laccol STA (a washing aid manufactured by Meisei Chemical Works, Ltd.) for 10 minutes and were dried to obtain pieces of textile printed fabric as recorded products.

The obtained pieces of textile printed fabric were subjected to each fastness test in accordance with JIS L 0844: 2011 A-2 Method and were evaluated in accordance with the following criteria. Silk (No. 2-1) described in JIS L 0803 was used as the standard adjacent fabric.

A: The result of fastness is Grade 4 or higher.
B: The result of fastness is Grade 3 or higher and less than Grade 4.
C: The result of fastness is Grade 2 or higher and less than Grade 3.
D: The result of fastness is less than Grade 2.

Table 1 to Table 6 collectively list these results together with the compositions of the ink compositions for ink jet textile printing of the respective examples and the respective comparative examples. In the tables, the unit of the content of each component is % by mass. C.I. Acid Blue 140 as the specific acidic dye is denoted as "AB140," C.I. Acid Blue 122 as the specific acidic dye as "AB122," C.I. Acid Violet 48 as the acidic dye as "AV48," triethylene glycol as the compound having a glycol structure as "TEG," diethylene glycol as the compound having a glycol structure as "DEG," dipropylene glycol as the compound having a glycol structure as "DPG," tripropylene glycol as the compound having a glycol structure as "TPG," triethylene glycol monobutyl ether as the compound having a glycol ether structure as "BTG," diethylene glycol monobutyl ether as the compound having a glycol ether structure as "BDG," dipropylene glycol monobutyl ether as the compound having a glycol ether structure as "DPGmB," dipropylene glycol monopropyl ether as the compound having a glycol ether structure as "DPGmP," 2-pyrrolidone as the cyclic amide-based solvent as "2PY," N-methyl-2-pyrrolidone as the cyclic amide-based solvent as "NMP," 1,3-dimethyl-imidazolidinone as the cyclic amide-based solvent as "DMI," N-hydroxyethyl-2-pyrrolidone as the cyclic amide-based solvent as "HEP," Cε-caprolactam as the cyclic amide-based solvent as "cCL," glycerin as "Gly," ethylenediamine tetraacetate as the chelating agent as "EDTA," Olfine E1010 (manufactured by Nissin Chemical Co., Ltd.) as an acetylene glycol-based surfactant as "E1010," triethanolamine as "TEA," Proxel XL-2 (manufactured by Lonza) as "XL2," and benzotriazole as an anticorrosive as "BTA." Table 1 to Table 6 also list the value of XAB112/XAB140 when the content of C.I. Acid Blue 112 and the content of C.I. Acid Blue 140 in the ink composition for ink jet textile printing are defined as XAB112 [% by mass] and XAB 140 [% by mass], respectively, the value of XG/XL and the value of XG+XL when the content of the glycol-based solvent and the content of the cyclic amide-based solvent in the ink composition for ink jet textile printing are defined as XG [% by mass] and XL [% by mass], respectively, and the value XAV48/XIAD when the content of the specific acidic dye and the content of C.I. Acid Violet 48 in the ink composition for ink jet textile printing are defined as XIAD [% by mass] and XAV48 [% by mass], respectively. All the ink compositions for ink jet textile printing of the respective examples had a surface tension at 20° C. of a value in a range of 30 mN/m or more and 40 mN/m or less and had a viscosity at 20° C. of a value in a range of 3 mPa-s or more and 8 mPa-s or less. The surface tension was measured by the Wilhelmy method using a surface tension meter (manufactured by Kyowa Interface Science Co., Ltd., DY-300). The viscosity was determined by measurement pursuant to JIS Z8809 using a vibration type viscometer (manufactured by Sekonic Corporation, VM-100).

TABLE 1

| | | | Example 1 | Example 2 | Example 3 | Example 4 | Example 5 | Example 6 | Example 7 | Example 8 |
|---|---|---|---|---|---|---|---|---|---|---|
| Content | Coloring | AB140 | 5.0 | 5.0 | 5.0 | 5.0 | 5.0 | 5.0 | 4.0 | 6.0 |
| | material | AB112 | 2.0 | 2.0 | 2.0 | 2.0 | 2.0 | 2.0 | 3.0 | 1.0 |
| | | AV48 | — | — | — | — | — | — | — | — |
| | Glycol- | TEG | 6.0 | 6.0 | 6.0 | 4.0 | 4.0 | 4.0 | 6.0 | 6.0 |
| | based | DEG | — | — | — | — | — | — | — | — |
| | solvent | DPG | — | — | — | — | — | — | — | — |
| | | TPG | — | — | — | — | — | — | — | — |
| | | BTG | 4.0 | 4.0 | 4.0 | 6.0 | 6.0 | 6.0 | 4.0 | 4.0 |
| | | BDG | — | — | — | — | — | — | — | — |
| | | DPGmB | — | — | — | — | — | — | — | — |
| | | DPGmP | — | — | — | — | — | — | — | — |
| | Cyclic | 2PY | — | — | — | — | — | — | — | — |
| | amide- | NMP | — | — | — | — | — | — | — | — |
| | based | DMI | — | — | — | — | — | — | — | — |
| | solvent | HEP | 7.0 | 3.5 | — | 7.0 | 3.5 | — | 7.0 | 7.0 |
| | | εCL | — | 3.5 | 7.0 | — | 3.5 | 7.0 | — | — |
| | Gly | | 10.0 | 10.0 | 10.0 | 10.0 | 10.0 | 10.0 | 10.0 | 10.0 |
| | Chelating agent | EDTA | 0.02 | 0.02 | 0.02 | 0.02 | 0.02 | 0.02 | 0.02 | 0.02 |
| | Other | E1010 | 1.0 | 1.0 | 1.0 | 1.0 | 1.0 | 1.0 | 1.0 | 1.0 |
| | components | TEA | 0.5 | 0.5 | 0.5 | 0.5 | 0.5 | 0.5 | 0.5 | 0.5 |
| | | XL2 | 0.1 | 0.1 | 0.1 | 0.1 | 0.1 | 0.1 | 0.1 | 0.1 |
| | | BTA | 0.01 | 0.01 | 0.01 | 0.01 | 0.01 | 0.01 | 0.01 | 0.01 |
| | Water | | 64.37 | 64.37 | 64.37 | 64.37 | 64.37 | 64.37 | 64.37 | 64.37 |
| | XAB112/XAB140 | | 0.40 | 0.40 | 0.40 | 0.40 | 0.40 | 0.40 | 0.75 | 0.17 |
| | XG/XL | | 1.43 | 1.43 | 1.43 | 1.43 | 1.43 | 1.43 | 1.43 | 1.43 |
| | XG + XL | | 17.0 | 17.0 | 17.0 | 17.0 | 17.0 | 17.0 | 17.0 | 17.0 |
| | XAB48/XIAD | | 0 | 0 | 0 | 0 | 0 | 0 | 0 | 0 |
| Evaluation | Continuous ejection reliability | | A | A | A | A | A | A | A | A |
| | Ejection recoverability | | A | A | A | A | A | A | A | A |
| | Storage stability | | A | A | A | A | A | A | A | A |
| | Color development | | A | A | A | A | A | A | A | A |
| | Fastness | Silk | B | B | B | B | B | B | B | A |
| | | Nylon | B | B | B | B | B | B | B | B |

TABLE 2

| | | | Example 9 | Example 10 | Example 11 | Example 12 | Example 13 | Example 14 |
|---|---|---|---|---|---|---|---|---|
| Content | Coloring | AB140 | 5.0 | 5.0 | 5.0 | 5.0 | 5.0 | 5.0 |
| | material | AB112 | 2.0 | 2.0 | 2.0 | 2.0 | 2.0 | 2.0 |
| | | AV48 | — | — | — | — | — | — |

TABLE 2-continued

| | | Example 9 | Example 10 | Example 11 | Example 12 | Example 13 | Example 14 |
|---|---|---|---|---|---|---|---|
| Glycol- | TEG | 8.0 | 8.0 | 8.0 | 8.0 | 10.0 | 10.0 |
| based | DEG | — | — | — | — | — | — |
| solvent | DPG | — | — | — | — | — | — |
| | TPG | — | — | — | — | — | — |
| | BTG | 4.0 | 4.0 | 7.0 | 7.0 | 5.0 | 5.0 |
| | BDG | — | — | — | — | — | — |
| | DPGmB | — | — | — | — | — | — |
| | DPGmP | — | — | — | — | — | — |
| Cyclic | 2PY | — | — | — | — | — | — |
| amide-based | NMP | — | — | — | — | — | — |
| solvent | DMI | — | — | — | — | — | — |
| | HEP | 6.0 | — | 5.0 | — | 5.0 | — |
| | εCL | — | 6.0 | — | 5.0 | — | 5.0 |
| Gly | | 10.0 | 10.0 | 10.0 | 10.0 | 10.0 | 10.0 |
| Chelating agent | EDTA | 0.02 | 0.02 | 0.02 | 0.02 | 0.02 | 0.02 |
| Other | E1010 | 1.0 | 1.0 | 1.0 | 1.0 | 1.0 | 1.0 |
| components | TEA | 0.5 | 0.5 | 0.5 | 0.5 | 0.5 | 0.5 |
| | XL2 | 0.1 | 0.1 | 0.1 | 0.1 | 0.1 | 0.1 |
| | BTA | 0.01 | 0.01 | 0.01 | 0.01 | 0.01 | 0.01 |
| Water | | 64.37 | 64.37 | 64.37 | 64.37 | 64.37 | 64.37 |
| XAB112/XAB140 | | 0.40 | 0.40 | 0.40 | 0.40 | 0.40 | 0.40 |
| XG/XL | | 2.0 | 2.0 | 3.0 | 3.0 | 3.0 | 3.0 |
| XG + XL | | 18.0 | 18.0 | 20.0 | 20.0 | 20.0 | 20.0 |
| XAB48/XIAD | | 0 | 0 | 0 | 0 | 0 | 0 |
| Evaluation | Continuous ejection reliability | A | A | B | B | B | B |
| | Ejection recoverability | A | A | A | A | A | A |
| | Storage stability | A | A | A | A | A | A |
| | Color development | A | A | A | A | A | A |
| | Fastness Silk | B | B | B | B | B | B |
| | Nylon | B | B | B | B | B | B |

TABLE 3

| | | | Example 15 | Example 16 | Example 17 | Example 18 | Example 19 | Example 20 |
|---|---|---|---|---|---|---|---|---|
| Content | Coloring | AB140 | 5.0 | 5.0 | 5.0 | 5.0 | 5.0 | 5.0 |
| | material | AB112 | 2.0 | 2.0 | 2.0 | 2.0 | 2.0 | 2.0 |
| | | AV48 | — | — | — | — | — | — |
| | Glycol- | TEG | 4.0 | 4.0 | 5.0 | 5.0 | 7.0 | 7.0 |
| | based | DEG | — | — | — | — | — | — |
| | solvent | DPG | — | — | — | — | — | — |
| | | TPG | — | — | — | — | — | — |
| | | BTG | 8.0 | 8.0 | 10.0 | 10.0 | 8.0 | 8.0 |
| | | BDG | — | — | — | — | — | — |
| | | DPGmB | — | — | — | — | — | — |
| | | DPGmP | — | — | — | — | — | — |
| | Cyclic | 2PY | — | — | — | — | — | — |
| | amide-based | NMP | — | — | — | — | — | — |
| | solvent | DMI | — | — | — | — | — | — |
| | | HEP | 6.0 | — | 5.0 | — | 5.0 | — |
| | | εCL | — | 6.0 | — | 5.0 | — | 5.0 |
| | Gly | | 10.0 | 10.0 | 10.0 | 10.0 | 10.0 | 10.0 |
| | Chelating agent | EDTA | 0.02 | 0.02 | 0.02 | 0.02 | 0.02 | 0.02 |
| | Other | E1010 | 1.0 | 1.0 | 1.0 | 1.0 | 1.0 | 1.0 |
| | components | TEA | 0.5 | 0.5 | 0.5 | 0.5 | 0.5 | 0.5 |
| | | XL2 | 0.1 | 0.1 | 0.1 | 0.1 | 0.1 | 0.1 |
| | | BTA | 0.01 | 0.01 | 0.01 | 0.01 | 0.01 | 0.01 |
| | Water | | 64.37 | 64.37 | 64.37 | 64.37 | 64.37 | 64.37 |
| | XAB112/XAB140 | | 0.40 | 0.40 | 0.40 | 0.40 | 0.40 | 0.40 |
| | XG/XL | | 2.0 | 2.0 | 3.0 | 3.0 | 3.0 | 3.0 |
| | XG + XL | | 18.0 | 18.0 | 20.0 | 20.0 | 20.0 | 20.0 |
| | XAB48/XIAD | | 0 | 0 | 0 | 0 | 0 | 0 |

TABLE 3-continued

| | | Example 15 | Example 16 | Example 17 | Example 18 | Example 19 | Example 20 |
|---|---|---|---|---|---|---|---|
| Evaluation | Continuous ejection reliability | A | A | B | B | B | B |
| | Ejection recoverability | A | A | A | A | A | A |
| | Storage stability | A | A | A | A | A | A |
| | Color development | A | A | A | A | A | A |
| | Fastness Silk | B | B | B | B | B | B |
| | Nylon | B | B | B | B | B | B |

TABLE 4

| | | | Example 21 | Example 22 | Example 23 | Example 24 | Example 25 | Example 26 | Example 27 | Example 28 |
|---|---|---|---|---|---|---|---|---|---|---|
| Content | Coloring material | AB140 | 5.0 | 5.0 | 5.0 | 5.0 | 5.0 | 5.0 | 7.0 | 5.0 |
| | | AB112 | 2.0 | 2.0 | 2.0 | 2.0 | 2.0 | 2.0 | — | — |
| | | AV48 | — | — | — | — | — | — | — | 2.0 |
| | Glycol-based solvent | TEG | — | — | — | 6.0 | 6.0 | 6.0 | 6.0 | 6.0 |
| | | DEG | 6.0 | — | — | — | — | — | — | — |
| | | DPG | — | 6.0 | — | — | — | — | — | — |
| | | TPG | — | — | 6.0 | — | — | — | — | — |
| | | BTG | 4.0 | 4.0 | 4.0 | — | — | — | 4.0 | 4.0 |
| | | BDG | — | — | — | 4.0 | — | — | — | — |
| | | DPGmB | — | — | — | — | 4.0 | — | — | — |
| | | DPGmP | — | — | — | — | — | 4.0 | — | — |
| | Cyclic amide-based solvent | 2PY | — | — | — | — | — | — | 1.0 | 1.0 |
| | | NMP | — | — | — | — | — | — | 0.5 | 0.5 |
| | | DMI | — | — | — | — | — | — | 0.1 | 0.1 |
| | | HEP | 7.0 | 7.0 | 7.0 | 7.0 | 7.0 | 7.0 | 7.0 | 7.0 |
| | | εCL | — | — | — | — | — | — | — | — |
| | | Gly | — | 10.0 | 10.0 | 10.0 | 10.0 | 10.0 | 10.0 | 10.0 |
| | Chelating agent | EDTA | 0.02 | 0.02 | 0.02 | 0.02 | 0.02 | 0.02 | 0.02 | 0.02 |
| | Other components | E1010 | 1.0 | 1.0 | 1.0 | 1.0 | 1.0 | 1.0 | 1.0 | 1.0 |
| | | TEA | 0.5 | 0.5 | 0.5 | 0.5 | 0.5 | 0.5 | 0.5 | 0.5 |
| | | XL2 | 0.1 | 0.1 | 0.1 | 0.1 | 0.1 | 0.1 | 0.1 | 0.1 |
| | | BTA | 0.01 | 0.01 | 0.01 | 0.01 | 0.01 | 0.01 | 0.01 | 0.01 |
| | Water | | 74.37 | 64.37 | 64.37 | 64.37 | 64.37 | 64.37 | 62.77 | 62.77 |
| | XAB112/XAB140 | | 0.40 | 0.40 | 0.40 | 0.40 | 0.40 | 0.40 | — | — |
| | XG/XL | | 1.43 | 1.43 | 1.43 | 1.43 | 1.43 | 1.43 | 1.16 | 1.16 |
| | XG + XL | | 17.0 | 17.0 | 17.0 | 17.0 | 17.0 | 17.0 | 18.6 | 18.6 |
| | XAB48/XIAD | | 0 | 0 | 0 | 0 | 0 | 0 | 0 | 0.40 |
| Evaluation | Continuous ejection reliability | | A | B | B | A | A | A | A | A |
| | Ejection recoverability | | A | A | A | A | B | B | A | A |
| | Storage stability | | A | A | A | A | A | A | A | A |
| | Color development | | A | A | A | A | A | A | B | A |
| | Fastness Silk | | B | B | B | B | B | B | A | A |
| | Nylon | | B | B | B | B | B | B | A | A |

TABLE 5

| | | | Example 29 | Example 30 | Example 31 | Example 32 | Example 33 | Example 34 | Example 35 |
|---|---|---|---|---|---|---|---|---|---|
| Content | Coloring material | AB140 | 4.0 | 6.0 | 5.0 | 5.0 | 5.0 | 5.0 | 7.0 |
| | | AB112 | — | — | 2.0 | 2.0 | 2.0 | 2.0 | 3.0 |
| | | AV48 | 3.0 | 1.0 | — | — | — | — | — |
| | Glycol-based solvent | TEG | 6.0 | 6.0 | — | 6.0 | 10.0 | 6.0 | 6.0 |
| | | DEG | — | — | — | — | — | — | — |
| | | DPG | — | — | — | — | — | — | — |
| | | TPG | — | — | — | — | — | — | — |
| | | BTG | 4.0 | 4.0 | 10.0 | 4.0 | — | 4.0 | 4.0 |
| | | BDG | — | — | — | — | — | — | — |
| | | DPGmB | — | — | — | — | — | — | — |
| | | DPGmP | — | — | — | — | — | — | — |

TABLE 5-continued

| | | | Example 29 | Example 30 | Example 31 | Example 32 | Example 33 | Example 34 | Example 35 |
|---|---|---|---|---|---|---|---|---|---|
| Cyclic amide-based solvent | | 2PY | — | — | — | — | — | — | — |
| | | NMP | — | — | — | — | — | — | — |
| | | DMI | — | — | — | — | — | — | — |
| | | HEP | 7.0 | 7.0 | 7.0 | 3.5 | 7.0 | 7.0 | 7.0 |
| | | εCL | — | — | — | — | — | — | — |
| Gly | | | 10.0 | 10.0 | 10.0 | 10.0 | 10.0 | 10.0 | 10.0 |
| Chelating agent | EDTA | | 0.02 | 0.02 | 0.02 | 0.02 | 0.02 | — | 0.02 |
| Other components | E1010 | | 1.0 | 1.0 | 1.0 | 1.0 | 1.0 | 1.0 | 1.0 |
| | TEA | | 0.5 | 0.5 | 0.5 | 0.5 | 0.5 | 0.5 | 0.5 |
| | XL2 | | 0.1 | 0.1 | 0.1 | 0.1 | 0.1 | 0.1 | 0.1 |
| | BTA | | 0.01 | 0.01 | 0.0 | 0.01 | 0.01 | 0.01 | 0.01 |
| Water | | | 64.37 | 64.37 | 64.37 | 67.87 | 64.37 | 64.39 | 61.37 |
| XAB112/XAB140 | | | 0 | 0 | 0.4 | 0.4 | 0.4 | 0.4 | 0.43 |
| XG/XL | | | 1.43 | 1.43 | 1.43 | 2.86 | 1.43 | 1.43 | 1.43 |
| XG + XL | | | 17.0 | 17.0 | 17.0 | 13.5 | 17.0 | 17.0 | 17.0 |
| XAB48/XIAD | | | 0.75 | 0.17 | 0 | 0 | 0 | 0 | 0 |
| Evaluation | Continuous ejection reliability | | A | A | A | B | B | A | C |
| | Ejection recoverability | | A | A | A | A | C | A | C |
| | Storage stability | | A | A | C | A | A | C | B |
| | Color development | | A | A | A | A | A | A | A |
| | Fastness | Silk | A | A | B | B | B | B | B |
| | | Nylon | A | A | B | B | B | B | B |

TABLE 6

| | | | Comparative Example 1 | Comparative Example 2 | Comparative Example 3 | Comparative Example 4 | Comparative Example 5 | Comparative Example 6 |
|---|---|---|---|---|---|---|---|---|
| Content | Coloring material | AB140 | 5.0 | 5.0 | 5.0 | 5.0 | 5.0 | 5.0 |
| | | AB112 | 2.0 | 2.0 | 2.0 | 2.0 | 2.0 | 2.0 |
| | | AV48 | — | — | — | — | — | — |
| | Glycol-based solvent | TEG | 6.0 | — | 6.0 | 5.0 | — | 10.0 |
| | | DEG | — | — | — | — | — | — |
| | | DPG | — | — | — | — | — | — |
| | | TPG | — | — | — | — | — | — |
| | | BTG | — | 4.0 | 4.0 | 3.0 | — | 8.0 |
| | | BDG | — | — | — | — | — | — |
| | | DPGmB | — | — | — | — | — | — |
| | | DPGmP | — | — | — | — | — | — |
| | Cyclic amide-based solvent | 2PY | — | — | — | — | — | — |
| | | NMP | — | — | — | — | — | — |
| | | DMI | — | — | — | — | — | — |
| | | HEP | 7.0 | 7.0 | — | 5.0 | 17.0 | — |
| | | εCL | — | — | — | — | — | — |
| | Gly | | 10.0 | 10.0 | 10.0 | 10.0 | 10.0 | 10.0 |
| | Chelating agent | EDTA | 0.02 | 0.02 | 0.02 | 0.02 | 0.02 | 0.02 |
| | Other components | E1010 | 1.0 | 1.0 | 1.0 | 1.0 | 1.0 | 1.0 |
| | | TEA | 0.5 | 0.5 | 0.5 | 0.5 | 0.5 | 0.5 |
| | | XL2 | 0.1 | 0.1 | 0.1 | 0.1 | 0.1 | 0.1 |
| | | BTA | 0.01 | 0.01 | 0.01 | 0.01 | 0.01 | 0.01 |
| Water | | | 68.37 | 70.37 | 71.37 | 68.37 | 64.37 | 63.37 |
| XAB112/XAB140 | | | 0.40 | 0.40 | 0.40 | 0.40 | 0.40 | 0.40 |
| XG/XL | | | 0.86 | 0.57 | — | 1.6 | 0 | — |
| XG + XL | | | 13.0 | 11.0 | 10.0 | 13.0 | 17.0 | 18.0 |
| XAB48/XIAD | | | 0 | 0 | 0 | 0 | 0 | 0 |
| Evaluation | Continuous ejection reliability | | B | A | D | B | C | D |
| | Ejection recoverability | | D | A | C | D | B | C |
| | Storage stability | | B | D | B | C | D | B |
| | Color development | | A | A | A | A | A | A |
| | Fastness | Silk | A | A | A | B | B | B |
| | | Nylon | A | A | A | A | B | B |

As is clear from Table 1 to Table 6, the present disclosure produced excellent results, whereas the comparative examples did not produce any satisfactory results.

What is claimed is:

1. An ink composition for ink jet textile printing, the ink composition comprising:

a specific acidic dye being at least one selected from a group consisting of C.I. Acid Blue 112 and C.I. Acid Blue 140;

a water-soluble organic solvent; and water, wherein a glycol-based solvent and a cyclic amide-based solvent are contained as the water-soluble organic solvent, the cyclic amide-based solvent contains at least N-hydroxyethyl-2-pyrrolidone, the glycol-based solvent includes dipropylene glycol monobutyl ether, and a content of the glycol-based solvent is 10.0% by mass or more.

2. The ink composition for ink jet textile printing according to claim 1, wherein the specific acidic dye contains both C.I. Acid Blue 112 and C.I. Acid Blue 140.

3. The ink composition for ink jet textile printing according to claim 1, wherein a content of the specific acidic dye is 12.0% by mass or less.

4. The ink composition for ink jet textile printing according to claim 1, wherein a compound having a glycol structure and a compound having a glycol ether structure are contained as the glycol-based solvent.

5. The ink composition for ink jet textile printing according to claim 1, wherein the glycol-based solvent includes one or more selected from a group consisting of diethylene glycol, triethylene glycol, dipropylene glycol, tripropylene glycol, triethylene glycol monobutyl ether, diethylene glycol monobutyl ether, and dipropylene glycol monopropyl ether.

6. The ink composition for ink jet textile printing according to claim 5, wherein the glycol-based solvent includes triethylene glycol.

7. The ink composition for ink jet textile printing according to claim 1, wherein a content of the cyclic amide-based solvent is 3.0% by mass or more.

8. The ink composition for ink jet textile printing according to claim 1, wherein a sum of a content of the glycol-based solvent and a content of the cyclic amide-based solvent is 15.0% by mass or more.

9. The ink composition for ink jet textile printing according to claim 1, further comprising a chelating agent in a content of 0.01% by mass or more.

10. The ink composition for ink jet textile printing according to claim 1, further comprising C.I. Acid Violet 48.

11. A method of ink jet textile printing, the method comprising an ink adhesion step of causing the ink composition for ink jet textile printing according to claim 1 to adhere to fabric by an ink jet method.

* * * * *